Patented Jan. 4, 1949

2,458,422

UNITED STATES PATENT OFFICE 2,458,422

ACRYLIC DIESTER-PROPIONAMIDES AND POLYMERS THEREOF

Delbert D. Reynolds and John H. Van Campen, Rochester, N. Y., assignors to Eastman Kodak Company, Rochester, N. Y., a corporation of New Jersey No Drawing. Application November 22, 1947, Serial No. 787,608

6 Claims. (Cl. 260—78.3)

This invention relates to a new group of unsaturated aliphatic diester-amides, polymers thereof, and processes for their preparation.

The new diester-amides of the invention contain two acryloxy or alpha substituted acryloxy groups joined together by the group,

The new compounds may be represented by the general structural formula:

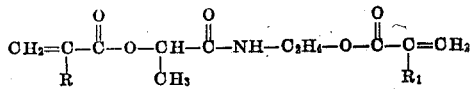

in which R and $R_1$ each represents the same or different members of the group consisting of hydrogen, a halogen atom (e. g. chlorine or bromine), a saturated alkyl group (e. g. methyl, ethyl, propyl, isopropyl, butyl, isobutyl, sec. butyl, tert. butyl, etc.), an aryl group (e. g. phenyl, naphthyl, tolyl, xylyl, etc.), an aralkyl group (e. g. benzyl, phenylethyl, etc.), an alkoxy or aryloxy group (e. g. methoxy, ethoxy, propoxy, isopropoxy, butoxy, phenoxy, etc.), a cycloalkyl group (e. g. cyclopropyl, cyclobutyl, cyclohexyl, etc.), an acyl group (e. g. acetyl, propionyl, butyryl, etc.), an acyloxy group (e. g. acetoxy, propionyloxy, butyryloxy, etc.), a heterocyclic group (e. g. piperidyl), a carboxyl group, a carbalkoxy group (e. g. carbmethoxy, carbethoxy, etc.), a cyano group, an amino group (e. g. dimethylamino, diphenylamino, methylphenylamino, etc.), a diacylamido group (e. g. phthalimido, etc.), and similar groups. 'The above-defined new diester-amides are non-resinous, crystalline or viscous liquid compounds which have distinct melting points and boiling points, and which are capable of isolation in the pure state from their preparation reaction mixtures. The monomers are soluble in most of the common organic solvents such as benzene, chloroform, dioxane, etc. They are valuable intermediates in the preparation of other useful chemical compounds. They are also excellent modifying agents in solution or in compositions designed for impregnating paper and textile fabrics, being capable of polymerization to insoluble resins in the particular material so impregnated or treated. In addition, they are polymerizable alone or conjointly with other unsaturated compounds to shaped products which are insoluble in all the common organic solvents. Such copolymers in completely polymerized state are characterized by being easily millable to the shaped object desired.

It is, accordingly, an object of the invention to provide a new class of unsaturated aliphatic diester-amides and polymers thereof. Another object is to provide a method for preparing the same. Other objects will become apparent hereinafter.

In accordance with the invention, the new diester-amides are prepared by esterifying N-(β-hydroxyethyl) lactamide with acrylic anhydride or α-substituted acrylic anhydrides, or with acrylyl chlorides having the general formula:

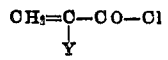

wherein Y represents hydrogen, a halogen atom, a cyano group, a saturated alkyl group, an aryl group, an aralkyl group, an alkoxy or aryloxy group, a cycloalkyl group, an acyl group, an acyloxy group, a heterocyclic group, a carboxyl group, a carbalkoxy group, an amino group or a diacylamido group, as previously defined. Where the acid chlorides are employed as the esterifying agent, the reaction is carried out advantageously at a temperature not exceeding 40° C., in an inert solvent medium such as anhydrous benzene, methyl acetate, chloroform, dioxane, etc., and in the presence of an acid-binding agent, for example, anhydrous sodium carbonate, and a dehydrating agent, for example, anhydrous calcium sulfate. This process is described and claimed in copending application, Serial No. 787,605, filed of even date herewith, in the names of Delbert D. Reynolds and William O. Kenyon. Where the acid anhydrides are employed as the esterifying agents, the reaction can be carried out advantageously in the presence of a polymerization inhibitor such as a copper salt and in the presence of an organic base such as pyridine. The α-substituted acrylic acid chlorides, above defined, may be prepared by treating the corresponding free acids or their esters with thionyl chloride or phosphorus chlorides. The diester-amides may be isolated from their preparation mixtures and purified in any convenient manner, for example, as described in the examples which follow.

The polymerization of the new diester-amides of the invention alone or conjointly with one or more other unsaturated compounds is accelerated by heat, and by polymerization catalysts which are known to accelerate the polymerization of acrylic compounds. Exemplary of such catalysts are the organic peroxides (e. g. benzoyl peroxide, acetyl peroxide and lauroyl peroxide), hydrogen peroxide, perborates (e. g.

alkali metal perborates) and persulfates (e. g. alkali metal persulfates). The polymerization can be effected in mass or in the presence of an inert diluent such as, for example, dioxane. However, the monomers can also be emulsified in a liquid in which they are insoluble (e. g. water) and the emulsion subjected to polymerization. The monomers can also be suspended in water using relatively poor dispersing agents such as starch, and polymerized in the form of granules. The monomers can also be copolymerized with one or more other ethylenic monomers having the general formulas:

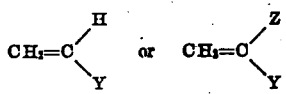

wherein Y and/or Z are alkyl, aryl, aralkyl, alkoxyl, aryloxy, aralkoxyl, halogeno, acylamido, sulfonamido, sulfamyl, acyloxyl, carbalkoxyl, carbamido, nitrile, aldehydo, heterocyclic, dialkylamino, acylimino, etc. Specific compounds coming within the above formulas include among others 1,2-propylene, furylethylene, isobutylene, vinyl formate, vinyl acetate vinyl propionate, vinyl butyrate, vinyl stearate, vinyl thioacetate, vinyl benzoate, vinyl oxalate, isopropenyl acetate, methylene dimethyl malonate, divinyl formal, acrolein, α-methacrolein, vinyl chloride, vinyl bromide, isopropenyl chloride, vinylidene chloride, vinyl chloroacetate, vinyl trichloroacetate, vinyl isocyanate, isopropenyl isocyanate, vinyl acetylene, vinyl urethane, vinyl methyl ketone, vinyl phenyl ketone, vinyl benzyl ketone, vinyl cyclohexyl ketone, vinyl furyl ketone, vinyl p-tolyl ketone, isopropenyl methyl ketone, vinyl methyl ether, vinyl butyl ether, divinyl ether, vinyl phenyl ether, isopropenyl methyl ether, vinyl sulfonamide, vinyl sulphonic acid, vinyl p-tolyl sulphoxide, vinyl β-naphthyl sulphone, vinyl p-tolyl sulphone, isopropenyl methyl sulphone, butadiene, isoprene, chloroprene, 2-acetoxy butadiene-1,3, N-vinyl acetamide, N-vinyl methylacetamide, N-vinyl phenylacetamide, N-vinyl ethylacetamide, N-vinyl methylformamide, N-vinyl acetanilide, N-vinyl p-tolyl acetamide, N-vinyl cyclohexylacetamide, N-vinyl N-methyl butyramide, N-vinyl pyrrole, N-vinyl pyrrolidene, N-vinyl carbazole, vinyl pyridine, vinyl quinoline, styrene, α-methyl styrene, α-chlorostyrene, vinyl phenol, vinyl naphthalene, divinyl benzene, isopropenyl benzene, N-vinyl succinimide, N-vinyl tetrahydrophthalimide, N-vinyl phthalimide, N-vinyl glutarimide, N-vinyl diglycolylimide, N-isopropenyl phthalimide, acrylonitrile, methacrylonitrile, α-methoxyacrylonitrile, α-acetoxyacrylonitrile, α-chloroacrylonitrile, α-phthalimidoacrylonitrile, α-phenoxyacrylonitrile, acrylic acid, methacrylic acid, α-chloroacrylic acid, methyl acrylate, methyl methacrylate, methyl ethacrylate, benzyl acrylate, allyl methacrylate, β-ethoxyethyl acrylate, acrylamide, N-diacetyl acrylamide, N-ethyl acrylamide, N-diethyl acrylamide, etc. Still other unsaturated organic compounds which can be copolymerized with the new diester amides of the invention to give valuable resinous products include the esters, amides and nitriles of maleic, fumaric, maleamic, fumaramic, citraconic and itaconic acids. Examples of the latter compounds include methyl maleate, methyl fumarate, dimethyl maleate, dimethyl fumarate, diethyl fumarate, diisopropyl maleate, diisopropyl fumarate, maleamide, fumaride, itaconamide, maleonitrile, fumaronitrile, citraconoitrile, itaconoitrile, and similar compounds.

The preferred copolymers of the invention are obtained with starting polymerization mixtures having from 0.2 to 99.8 parts by weight of the new monomeric diester-amide and from 99.8 to 0.2 parts by weight of one or more of the other above-mentioned unsaturated organic compounds.

The following examples illustrate further our new diester-amides, polymers thereof, and the process of their preparation.

*Example 1.—N-(β-methacryloxyethyl) α-methacryloxy propionamide*

310 gms. of methacrylic anhydride, 130 gms. of N-(β-hydroxyethyl) lactamide and a small quantity of copper acetate (as an inhibitor of polymerization) were mixed together and heated on a steam bath for a period of 18 hours. There were then added 300 c. c. of benzene and the resulting solution washed with a 5 per cent aqueous sodium carbonate solution, and then with water. The benzene layer was dried over anhydrous magnesium sulfate and decolorized with activated charcoal. The benzene was removed by a stream of warm dry air blown over the surface. A residue of a crystalline material was obtained which, after recrystallization from ether, had a melting point of 85° C. Analysis of the crystals gave a nitrogen content of 5.24 per cent by weight as compared with calculated theory for nitrogen of 5.20 per cent by weight.

The intermediate compound, N-(β-hydroxyethyl) lactamide, employed in the above example was prepared by heating together equimolar quantities of ethyl lactate and ethanolamine in benzene, in a flask fitted to a fractionating column having a variable take-off head. The benzene solution was refluxed for a few minutes, after which time the benzene-ethanol azeotrope was slowly distilled from the mixture. When the theoretical amount of alcohol had been eliminated, the distillate temperature rose to 80° C., at which point distillation was continued at 10-15 mm. pressure to remove the benzene as completely as possible. The residue was then distilled at a pressure of 10-15 microns. The distillate obtained was a clear, colorless, viscous liquid. Analysis of this product indicated that a substantially pure product of N-(β-hydroxyethyl) lactamide had been obtained.

*Example 2.—N-(β - acryloxyethyl) α - acryloxy propionamide*

133 gms. of N-(β-hydroxyethyl) lactamide, 200 gms. of anhydrous sodium carbonate, 400 gms. of anhydrous calcium sulfate and 5 c. c. of anhydrous pyridine were stirred together for one hour in 800 c. c. of anhydrous dioxane. The reaction mixture was cooled in an ice bath, 270 gms. of acrylyl chloride added and the temperature allowed to rise to room temperature. The mixture was stirred for a period of 17 hours at this temperature, after which time 100 c. c. of pyridine was added and stirring continued for another hour. The mixture was then filtered and the filtrate decolorized with activated charcoal and then concentrated under vacuum to a syrup on a steam bath. The syrup was dissolved in chloroform and the resulting solution washed with dilute sulfuric acid and then with water. The treated chloroform solution was dried over anhydrous calcium sulfate, the chloroform removed at room temperature under vacuum, and the residue of N-(β-acryloxyethyl) α-acryloxy propionamide obtained in the form of a viscous syrup. In place of the acrylyl chloride in the above example, these may be employed an equivalent amount of α-chloro acrylyl cloride to obtain the compound, N-(β-chloroacryloxyethyl) α-chloroacryloxy propionamide.

*Example 3.—Poly-N-(β-acryloxyethyl) α-acryloxy propionamide*

10 gms. of the syrupy monomer prepared in Example 2 were mixed with 50 c. c. of anhydrous dioxane, 0.1 gm. of benzoyl peroxide added and the mixture heated on a steam bath. Within 5 minutes the solution had become cloudy and the polymer started separating out gradually. The mixture was heated for an additional two hours. Methanol was then added and the mixture stirred and filtered. The white, granular polymer so obtained was washed with methanol and dried. It was insoluble in all common organic solvents. The analysis of the polymer gave a nitrogen content of 5.5 per cent by weight indicating thereby that the polymer was made from a substantially pure compound of N-(β-acryloxyethyl) α-acryloxy propionamide.

*Example 4. — Poly-N-(β-methacryloxyethyl) α-methacryloxy propionamide*

10 gms. of the monomer prepared in Example 1, 0.1 gm. of benzoyl peroxide and 50 c. c. of dry dioxane were mixed together and placed on a steam bath. Within a few minutes, the solution had set to a hazy solid. The polymer was insoluble in all common organic solvents.

*Example 5.—Copolymer of N-(β-acryloxyethyl) α-acryloxy propionamide and vinyl acetate*

1 gm. of N-(β-acryloxyethyl) α-acryloxy propionamide, 10 gms. of vinyl acetate and 0.05 gm. of benzoyl peroxide were heated together in a sealed tube at 50° C. After 24 hours, a tough, soft polymer had formed which was insoluble in all common organic solvents.

*Example 6.—Copolymer of N-(β-acryloxyethyl) α-acryloxy propionamide and methyl acrylate*

(a) A mixture of 1 gm. of N-(β-acryloxyethyl)-α-acryloxy propionamide, 10 gm. of methyl acrylate and 0.05 gm. of benzoyl perovide was heated in a sealed tube at 50° C. for a period of 24 hours. A tough, soft polymer was obtained, which was insoluble in all common organic solvents.

(b) A mixture of 10 gms. of N-(β-acryloxyethyl) α-acryloxy propionamide, 10 gms. of methyl acrylate and 0.10 gm. of benzoyl peroxide was heated in a sealed tube at 50° C. for a period of 24 hours. A clear, hard and easily millable polymer was obtained. The polymer was insoluble in all common organic solvents.

*Example 7.—Copolymer of N-(β-acryloxethyl) α-acryloxy propionamide and styrene*

A mixture of 2 gms. of N-(β-acryloxyethyl) α-acryloxy propionamide, 18 gms. of styrene and 0.10 gm. of benzoyl peroxide was heated in a sealed tube at 50° C. for a period of 24 hours. There was obtained a clear, hard, easily millable polymer, which was insoluble in all organic solvents.

*Example 8.—Copolymer of N-(β-Methacryloxyethyl) α-methacryloxy propionamide and methyl methacrylate*

19 gms. of methyl methacrylate, 1 gm. of N-(β-methacryloxyethyl) α-methacryloxy propionamide and 0.10 gm. of benzoyl peroxide were mixed together and heated in a clear glass tube in a 60° C. water bath. A clear, hard, bubbly polymer was obtained.

*Example 9.—Copolymer of N-(β-methacryloxyethyl) α-methacryloxy propionamide and styrene*

19 gms. of styrene, 1 gm. of N-β-methacryloxyethyl) α-methacryloxy propionamide and 0.10 gm. of benzoyl peroxide were mixed together and heated in a clear glass tube in a 60° C. water bath. There was obtained a clear, hard polymer.

Other examples of our new copolymeric compounds, prepared in manner generally similar to the processes described in the preceding examples are illustrated in the following table:

| N-(β-Methacryloxyethyl) α-methacryloxy propionamide, per cent by weight | Second Monomer, per cent by weight | Characteristics of Copolymer |
|---|---|---|
| 1 | 99 Methyl methacrylate | Hard, clear, bubbly and insoluble in organic solvents. |
| 2 | 98 Methyl Methacrylate | Do. |
| 5 | 95 Methyl Methacrylate | Do. |
| 1 | 99 Vinyl acetate | Hazy, soft and insoluble in organic solvents. |
| 2 | 98 Vinyl acetate | Do. |
| 5 | 95 Vinyl acetate | Do. |
| 1 | 99 Styrene | Hard, clear and insoluble in organic solvents. |
| 2 | 98 Styrene | Do. |
| 5 | 95 Styrene | Do. |
| 1 | 99 Diethyl fumarate | Hard, clear and insoluble in organic solvents. |
| 2 | 98 Diethyl fumarate | Do. |
| 5 | 95 Diethyl fumarate | Do. |
| 1 | 36.5 Isopropenyl acetate, 62.5 Diethyl fumarate | Hard, clear and insoluble in organic solvents. |
| 2 | 36 Isopropenyl acetate, 62 Diethyl fumarate | Do. |
| 5 | 35 Isopropenyl acetate, 60 Diethyl fumarate | White, hard and insoluble in organic solvents. |

When completely polymerized, all the homopolymers and copolymers made from our new diester-amides are insoluble in all the common organic solvents, indicating thereby a definite cross-linking property of these diester-amides. Due to the presence, however, of the group, —CH(CH₃) CONH C₂H₄—, connecting the acrylic end groups of the diester-amide molecule, the cross-links between the resin chains are longer and allow more movement between the polymer molecules so cross-linked. As a consequence, the new polymers are less compact and dense, have improved physical properties and are more easily workable by mechanical means, than polymers not containing the above-mentioned connecting group. This permits of wider application of these polymers. For example, any of the new monomeric diester-amides, alone or admixed with one or more other monomeric unsaturated compounds such as those previously mentioned can be employed in solution in an organic solvent or in suspension in a carrier medium such as water, and containing other materials such as polymerization catalyst, and if desired, also containing softening and filling materials, to impregnate or coat paper, textile materials such as threads, fibers, fabrics of cellulose, cellulose esters and synthetic textile materials, etc., followed by heating the treated material to polymerize the unsaturated constituents in situ.

The new diester-amides, alone or admixed with other monomeric unsaturated compounds such as mentioned previously, may also be polymerized in a mold to a shaped object which subsequently can be worked to final shape by mechanical means such as sanding, milling, boring, sawing, etc.

We claim:

1. A compound having the general structural formula:

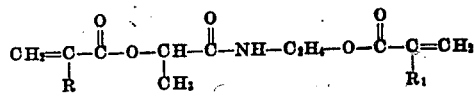

wherein R and R₁ each represents a member selected from the group consisting of an atom of hydrogen, a halogen atom, a cyano group, an alkyl group, an aryl group, an aralkyl group, an alkoxy group, an aryloxy group, a cycloalkyl group, a carboxylic acid acyl group, a carboxylic acid acyloxy group, a piperidyl group, a carboxyl group, a carbalkoxy group and an amino group.

2. N-(β-acryloxyethyl) α-acryloxy propionamide.

3. N-(β-methacryloxyethyl) α-methacryloxy propionamide.

4. N-(β-chloroacryloxyethyl) α-chloroacryloxy propionamide.

5. A polymer of a compound having the general structural formula:

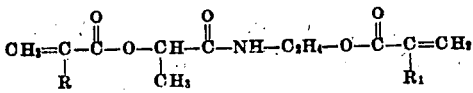

wherein R and R₁ each represents a member selected from the group consisting of an atom of hydrogen, a halogen atom, a cyano group, an alkyl group, an aryl group, an aralkyl group, an alkoxy group, an aryloxy group, a cycloalkyl group, a carboxylic acid acyl group, a carboxylic acid acyloxy group, a piperidyl group, a carboxyl group, a carbalkoxy group and an amino group.

6. A copolymer of from 0.2 to 99.8 parts by weight of N-(β-acryloxyethyl) α-acryloxy propionamide and from 99.8 to 0.2 parts by weight of styrene.

DELBERT D. REYNOLDS.
JOHN H. VAN CAMPEN.

REFERENCES CITED

The following references are of record in the file of this patent:

UNITED STATES PATENTS

| Number | Name | Date |
| --- | --- | --- |
| 2,141,546 | Strain | Dec. 27, 1938 |
| 2,311,548 | Jacobson et al. | Feb. 16, 1943 |
| 2,357,283 | Peters | Sept. 5, 1944 |